(12) United States Patent
Lee et al.

(10) Patent No.: US 8,773,539 B2
(45) Date of Patent: Jul. 8, 2014

(54) CAMERA MODULE TEST AND FOCUS CONTROLLING APPARATUS

(75) Inventors: Jong Dae Lee, Gyeonggi-do (KR); Woo Seong Moon, Gyeonggi-do (KR); Kyung Hee Han, Gyeonggi-do (KR); Seong Cheol Hong, Gyeonggi-do (KR); Kyoung Jung Kim, Seoul (KR)

(73) Assignee: Ismedia Co., Ltd., Gyeonggi-Do (KR)

( * ) Notice: Subject to any disclaimer, the term of this patent is extended or adjusted under 35 U.S.C. 154(b) by 233 days.

(21) Appl. No.: 13/509,201

(22) PCT Filed: Nov. 10, 2009

(86) PCT No.: PCT/KR2009/006598
§ 371 (c)(1),
(2), (4) Date: Jun. 4, 2012

(87) PCT Pub. No.: WO2011/059122
PCT Pub. Date: May 19, 2011

(65) Prior Publication Data
US 2012/0229652 A1    Sep. 13, 2012

(51) Int. Cl.
*H04N 17/00* (2006.01)
(52) U.S. Cl.
USPC .......................................... 348/187; 356/124
(58) Field of Classification Search
CPC ..... H04N 17/002; H04N 5/217; H04N 17/00; H04N 17/02
USPC .......................................................... 348/187
See application file for complete search history.

(56) References Cited

U.S. PATENT DOCUMENTS

| 7,248,347 B2 * | 7/2007 | Knoedgen et al. ............ 356/124 |
| 2003/0034788 A1 * | 2/2003 | Cugini et al. ................. 324/752 |
| 2004/0189812 A1 * | 9/2004 | Gustavsson et al. ..... 348/207.99 |
| 2009/0167869 A1 * | 7/2009 | Knoedgen et al. ............ 348/187 |

FOREIGN PATENT DOCUMENTS

| JP | 2009-168997 A | 7/2009 |
| KR | 10-0503760 B1 | 7/2005 |
| KR | 10-0794595 B1 | 1/2008 |

* cited by examiner

*Primary Examiner* — Twyler Haskins
*Assistant Examiner* — Fayez Bhuiyan
(74) *Attorney, Agent, or Firm* — Rabin & Berdo, P.C.

(57) ABSTRACT

A camera module test and focus controlling apparatus includes: a base with four actuators therein; a socket frame on one upper side of the base, and rotated by a first actuator; socket boards on both sides of the frame, lifted and lowered by a second actuator, and mounted with a camera module; a collet unit on the upper part of the base, disposed in vertical alignment with the boards, and rotated by a fourth actuator on the base; a rotational shaft on the base upper part, and connected to one side of a third actuator; a plate on an upper part of the shaft rotated by the third actuator, having a lens and an illuminating unit thereon; a first chart unit on the plate; and a second chart unit parallel with the base upper part, fixed to an upper part of a connection member vertically extended from the base.

3 Claims, 5 Drawing Sheets

Fig. 7

CAMERA MODULE TEST AND FOCUS CONTROLLING APPARATUS

TECHNICAL FIELD

The present invention relates to an apparatus for testing a camera module, and more specifically to a camera module test and focus controlling apparatus. The apparatus comprises: a base which is equipped with a first actuator, a second actuator, and a third actuator therein; a socket frame which is positioned on one upper side of the base, and is rotated by the first actuator; socket boards which are positioned on both sides of the socket frame, are lifted up and down by the second actuator, and are mounted with a camera module; a collet unit which is positioned in the upper part of the base, is disposed in a vertical line of the socket boards, and is rotated by a fourth actuator equipped in the upper part of the base; a rotational shaft which is positioned in the upper part of the base, and is connected to one side of the third actuator; a rotary plate which is rotated by the third actuator by being combined with the upper part of the rotational shaft, and is mounted with a lens and an illuminating unit therebetween; a first chart unit which is positioned in the upper part of the rotary plate; and a second chart unit which is fixed to the upper part of a connection member that is vertically extended from one side of the base in order to be parallel with the upper part of the base.

BACKGROUND ART

A camera module is mainly categorized into fixed focus (FF) type and auto focus (AF) type. The FF type module has one fixed focal distance. The AF type basically has fixed focal distance, but the focal distance can vary when an actuator formed within lens unit is operated by electric current or voltage applied to the lens unit. The AF camera module generally has a lens system including a plurality of lenses, and also includes an actuator such as voice coil motor (VCM) so that the respective lenses can be moved to thus vary relative distances and optical focal distance.

Recent mobile phones are mounted with cameras which enable users to take still or moving images. These cameras keep advancing further, thus providing higher resolution and higher picture quality.

Camera modules mounted on the mobile phones necessarily go through operation tests. To be specific, presence of defect is determined through open/short test, resistance value measurement of electric line, current consumption test, input/output leakage current test, or the like.

Further, before shipment from the factory, the camera module has to go through a fixed focus controlling in which lens unit is precision-rotated to determine fastening depth so that the lens unit is at a specific fixed focal distance with a sensor and a housing, and the camera module also goes through tests such as image test, and AF driving test. The focusing is the process of testing fixed focus of the lens, the image test is the process of precise-analyzing output image of the camera module to find defect in unit pixels within sensor or defects such as scratches or particles, and the AF driving test is the process of inspecting malfunction of automatic focusing by driving a driving unit of the camera module such as VCM.

Conventionally, since different devices are used to conduct the fixed focus controlling, the image test and the AF driving test with respect to the camera module, the process is quite cumbersome.

Further, while it is necessary to descend the collet unit of the focusing chart unit (including minimized optical system to form a virtual distance with the focusing chart with an image) for fixed focus test to control fixed focus with respect to the camera module, the focusing chart unit is relatively heavy and bulky. Therefore, quite complicated driving mechanism is used.

Further, the lens unit of the camera module is oftentimes damaged when the collet unit of the focusing chart unit descends excessively.

Further, regarding AF type camera module, the actuator structure has a drawback in which it is difficult to obtain exact focus measurement due to contact pressure of the collet to the lens unit during fixed focus controlling operation.

DISCLOSURE

Technical Problem

Accordingly, the present invention has been made to overcome the problems explained above, and an object of the present invention is to provide a camera module test and focus controlling apparatus according to which it is possible to process a series of camera module test processes including fixed focus controlling, image test and AF driving test with one device and with increased efficiency and accuracy.

Technical Solution

In order to achieve the above-mentioned object of the present invention, a camera module test and focus controlling apparatus is provided which may include: a base including therein a first driving unit, a second driving unit, and a third driving unit; a socket frame provided on an upper side of the base and rotated by the first driving unit; socket boards provided on both sides of the socket frame and lifted up by the second driving unit, the socket boards mounted with the camera module thereon; a collet unit formed on an upper part of the base and located vertically to the socket board and rotated by a fourth driving unit formed on an upper part of the base; a rotary shaft formed on an upper part of the base and connected to a side of the third driving unit; a rotary plate engaged with an upper part of the rotary shaft, rotated by the third driving unit and having a lens and an illuminating unit thereon; a first chart unit formed on an upper part of the rotary plate; and a second chart unit fixed on an upper part of a connecting member which is extended vertically from a side of the base in parallel with the upper part of the base.

Meanwhile, according to the present invention, the first driving unit includes a motor which is engaged with a rotary shaft coupled with a center of the socket frame to rotate the socket frame; the second driving unit includes a motor, a ball screw provided adjacent to the motor, pulleys provided on certain sides of the motor and the ball screws to transmit rotary force of the motor to the ball screw, a belt connecting the pulleys, and a lifting unit provided on the other side of the ball screw to lift up the socket board placed on the upper part of the socket frame with the lifting unit; the third driving unit includes a motor to connect to the rotary shaft placed on the upper part of the base to thus rotate the rotary plate; and the fourth driving unit includes a motor provided on an upper part of the base, a pulley connected to a side of the motor, and a belt connecting the pulley and an outer circumferential surface of the collet unit, to thereby rotate the collet unit with the rotation of the motor.

Further, according to the present invention, an analyzing means connected with the camera module is additionally provided to perform functions including: rotating the rotary plate to the third driving unit so that the vertical positions of the camera module and the illuminating unit are aligned, and irradiating light to inspect presence of image defect of the camera module; rotating the rotary plate to the third driving unit so that the vertical positions of the camera module, the lens and the second chart unit are aligned, photographing the second chart unit with camera module, and performing fixed focus controlling of the camera module by repeating step ① until the camera module becomes the optimum focus state, in which step ① is the process of receiving the photographed data for analysis of focus state, lifting up the socket board with the second driving unit to connect to the collet unit if the camera module is not in the optimum focus state, driving the collet unit 20 with the fourth driving unit to adjust the camera module, and moving down the socket board with the second driving unit to prevent contact pressure from being exerted on the lens unit of the camera module; and if the camera module is in the optimum focus state, rotating the rotary plate with the third driving unit so that the vertical positions of the camera module and the first chart unit are aligned, and performing AF driving test.

Advantageous Effects

The present invention provides an effect in which it is possible to conduct fixed focus controlling, image test and AF focus driving test with respect to an AF type camera module with only one equipment.

Further, the present invention provides an effect in which it is possible to conduct fixed focus testing through a simpler driving mechanism, by keeping a focusing chart unit stationary while lifting up or down the camera module.

Further, the present invention provides an effect in which it is possible to prevent inaccurate focus measurement or damage of the lens unit of the camera module due to influence such as contact pressure by the collet unit of the focusing chart unit.

<Explanation of reference numerals of main elements of the drawings>

| | | | |
|---|---|---|---|
| 10: | base | 20: | collet unit |
| 31: | rotary plate | 32: | lens |
| 33: | illuminating unit | 40: | socket frame |
| 41, 41: | socket boards | 50: | second chart unit |
| 60: | first chart unit | 71: | first driving unit |
| 72: | second driving unit | 73: | third driving unit |
| 74: | fourth driving unit | | |

BEST MODE

Mode for Invention

The present invention will be explained in greater detail below with reference to the accompanying drawings.

The present invention relates to an apparatus for testing a camera module and controlling focus thereof, and more particularly, to a camera module test and focus controlling apparatus in which it is possible to conduct fixed focus controlling, image test and automatic focus (AF) driving test of the camera module with only one device.

A camera module (compact camera module: CCM) is implemented in a variety of IT devices including mobile communication device such as camera phone, PDA, or smartphone, and toy camera. An increasing number of the devices mounted with compact cameras module has been supplied recently to suit customers various tastes.

The camera module generally includes an image sensor such as CCD or CMOS as a main component, to focus image of an object and store it on a memory within the device as data so that the stored data can be displayed in the form of an image through a display medium such as LCD or PC monitor.

A conventional camera module is generally manufactured in COB (chip on board), COF (chip on flexible), or the like, and among these, a representative example of COB structure will be briefly explained below with reference to the drawing.

Figure 1:
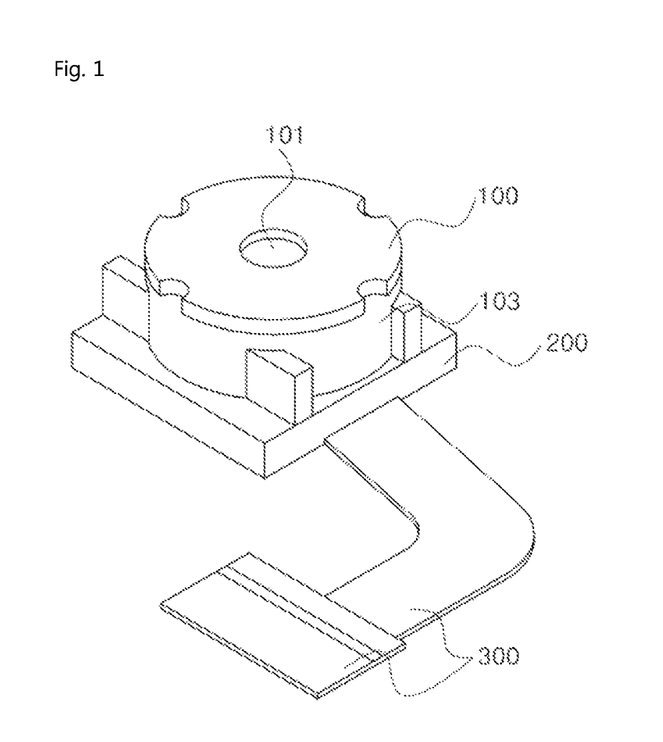
FIGS. 1 to 3 are views illustrating an example of a conventional camera module.
Figure 2:
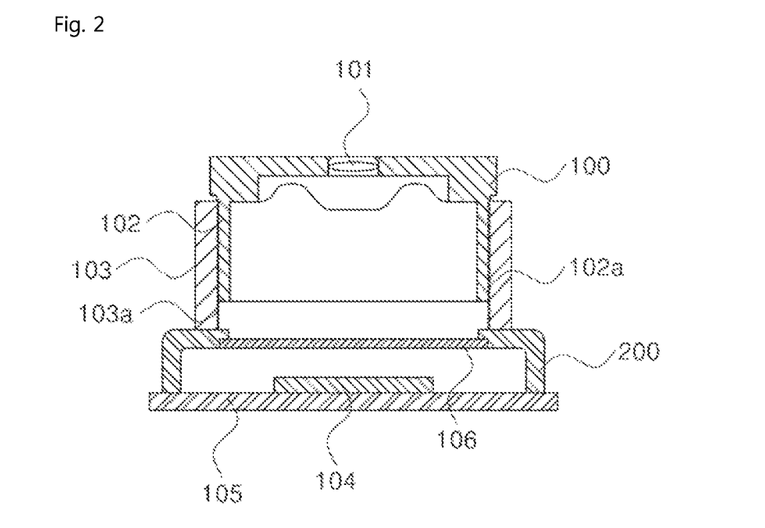
Figure 3:
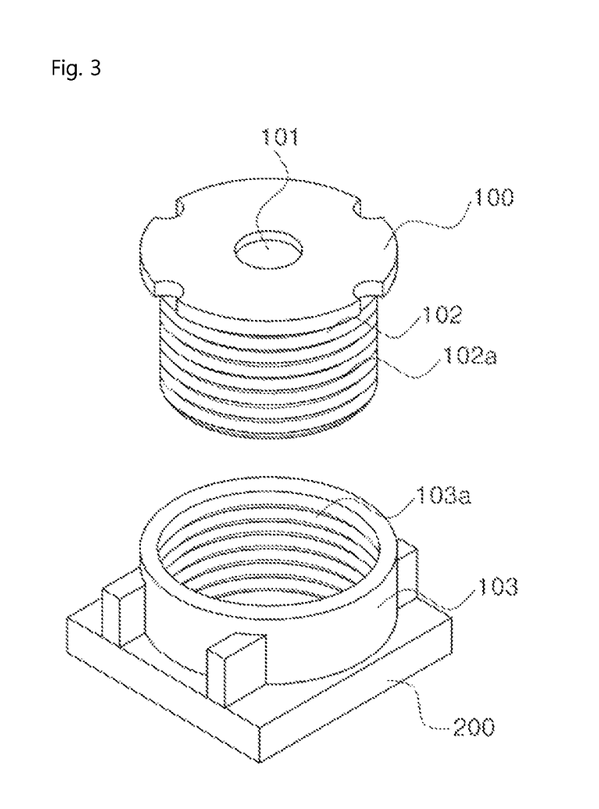

FIG. 1 is an exploded perspective view of a COB type camera module, FIG. 2 is a cross section view schematically illustrating a COB type camera module, and FIG. 3 is a perspective view of a COB type camera module with removable connector. A camera module is generally fabricated by the process in which a printed circuit board (PCB) 105 with an image sensor 104 such as CCD or CMOS mounted thereon by wire bonding is engaged with a lower part of the housing 200, and a lens barrel 100 with a downwardly-extending cylindrical body 102 is engaged with an adapter 103 which is upwardly extended to an upper part of the housing 200.

The housing 200 and the lens barrel 100 of the camera module are engaged with each other, as female screw portion 103a formed on an inner circumferential surface of the adaptor 103 and male screw portion 102a formed on an outer circumferential surface of the cylindrical body 102 are coupled with each other.

At this time, since an IR filter 106 is coupled between the lens 101, which is mounted on a lower end of the lens barrel 100 on an upper surface of the PCB 105, and the image sensor 104 attached to a lower surface of the PCB 105, excessive long-wavelength infrared ray is blocked from entering the image sensor 104.

In the camera module assembled as explained above, a ray of light entering from a specific object is reversed as it passes the lens 101 and focused on the surface of the image sensor 104. In this situation, the lens barrel 100 engaged with the upper end of the housing 200 is rotated by screw-coupling, and when a location of optimum focus is found, adhesive is introduced into the clearance between the housing 200 and the lens barrel 100, to thus fix the housing 200 and the lens barrel 100 by adhesion. As a result, final camera module product is fabricated.

In the camera module with the structure explained above, in order to find an accurate focus of the lens 101 on the light receiving area of the image sensor 104, a worker rotates the lens barrel 100 mounted with the lens 101 corresponding to the image sensor 104 mounted on a lower surface of the housing 200 left and right, while observing the image captured on the image sensor 104 with his eyes and controlling a distance between the image sensor 104 and the lens 101 until the captured image becomes clear enough. When the clearest image is captured at the image sensor 104, the housing 200 and the lens barrel 100 are fixed by adhesion so that the lens is fixed in position.

Further, focus controlling is carried out by placing the second chart unit 50 on an upper part of the lens barrel 100 which is temporarily engaged with the upper part of the housing 200, extracting control factors such as contrast value of an image of the second chart unit 50 captured through the image sensor 104, and comparing the extracted contrast values. A reference numeral 300 denotes a connector.

The constitution of the camera module test apparatus which carries out fixed focus controlling, image test and AF test with one device, and a method for conducting fixed focus controlling, image test and AF test of the camera module with the above will be explained below in greater detail.

Figure 4:
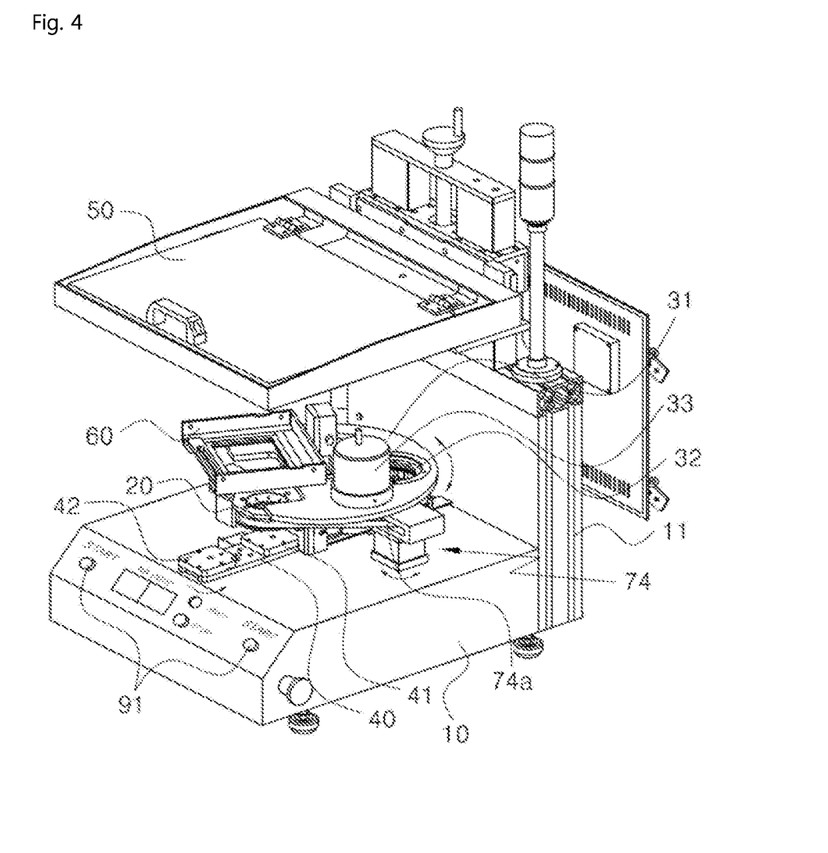
FIG. 4 is a view illustrating a camera module test apparatus according to an embodiment of the present invention.
Figure 5:
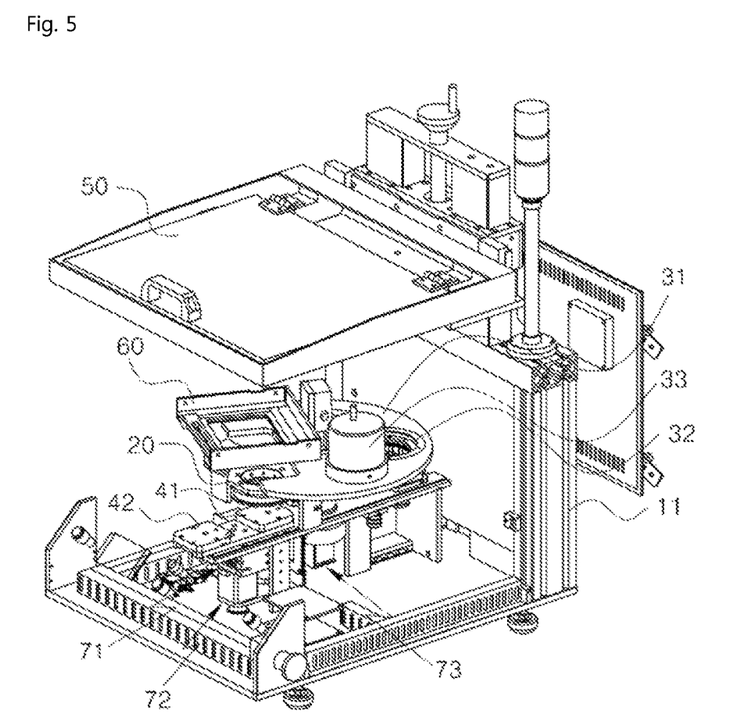
FIG. 5 is a view illustrating a base of the camera module test apparatus of FIG. 4 with an upper part open.
Figure 6:
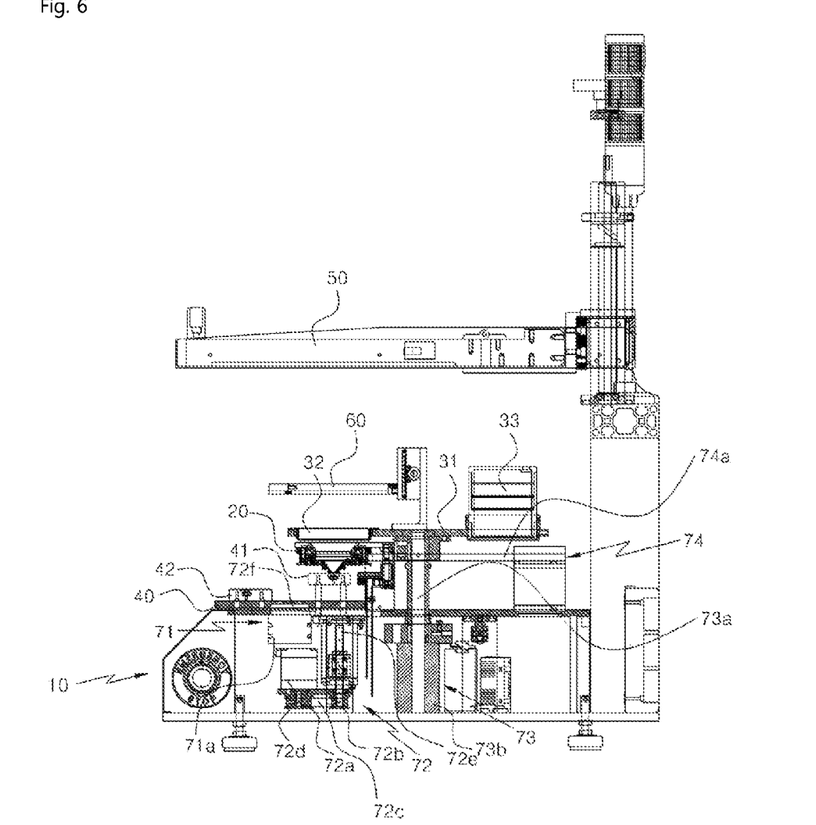
FIG. 6 is a side cross-section view of a camera module test apparatus according to an embodiment of the present invention.

The camera module test apparatus includes a base 10 including therein a first driving unit 71, a second driving unit 72, and a third driving unit 73, a socket frame 40 provided on an upper side of the base 10 and rotated by the first driving unit 71, socket boards 41, 42 provided on both sides of the socket frame 40 and lifted up by the second driving unit 72, the socket boards 41, 42 mounted with the camera module thereon, a collet unit 20 formed on an upper part of the base 10 and located vertically to the socket board 41 and rotated by a fourth driving unit 74 formed on an upper part of the base 10, a rotary shaft 73a formed on an upper part of the base 10 and connected to a side of the third driving unit 73, a rotary plate 31 engaged with an upper part of the rotary shaft 73a, rotated by the third driving unit 73 and having a lens 32 and an illuminating unit 33 thereon, a first chart unit 60 formed on an upper part of the rotary plate 31, and a second chart unit 50 fixed on an upper part of a connecting member 11 which is extended vertically from a side of the base 10 in parallel with the upper part of the base.

The first driving unit 71 includes a motor 71a which is engaged with a rotary shaft (not illustrated) coupled with a center of the socket frame 40 to rotate the socket frame 40, and the second driving unit 72 includes a motor 72d, a ball screw 72e provided adjacent to the motor 72d, pulleys 72a, 72b provided on certain sides of the motor 72d and the ball screws 72e to transmit rotary force of the motor 72d to the ball screw 72e, a belt 72c connecting the pulleys 72a, 72b, and a lifting unit 72f provided on the other side of the ball screw 72e to lift up the socket board 71 placed on the upper part of the socket frame 40 with the lifting unit 72f. The third driving unit 73 includes a motor 73b to connect to the rotary shaft 73a placed on the upper part of the base 10 to thus rotate the rotary plate 31. The fourth driving unit 74 includes a motor provided on an upper part of the base 10, a pulley connected to a side of the motor, and a belt 74a connecting the pulley and an outer circumferential surface of the collet unit 20, to thereby rotate the collet unit 20 with the rotation of the motor.

According to a preferred embodiment of the present invention, an analyzing means connected with the camera module is additionally provided to perform functions including: rotating the rotary plate 31 to the third driving unit 73 so that the vertical positions of the camera module and the illuminating unit 33 are aligned, and irradiating light to inspect presence of image defect of the camera module; rotating the rotary plate 31 to the third driving unit 73 so that the vertical positions of the camera module, the lens 32 and the second chart unit 50 are aligned, photographing the second chart unit 50 with camera module, and performing fixed focus controlling of the camera module by repeating step ① until the camera module becomes the optimum focus state, in which step ① is the process of receiving the photographed data for analysis of focus state, lifting up the socket board 41 with the second driving unit 72 to connect to the collet unit 20 if the camera module is not in the optimum focus state, driving the collet unit 20 with the fourth driving unit 74 to adjust the camera module, and moving down the socket board 41 with the second driving unit 72 to prevent contact pressure from being exerted on the lens unit of the camera module; and rotating the rotary plate 31 with the third driving unit 73 so that the vertical positions of the camera module and the first chart unit 60 are aligned if the camera module is in the optimum focus state, and performing AF driving test.

The base 10 plays a role of supporting the camera module test apparatus at a horizontal state, and at the same time, the base 10 fixes the second chart unit 50 in parallel relationship with the upper part of the base 10 through the socket boards 41, 42 on which the camera module is mounted, the rotary shaft 73a provided on the upper part of the base 10 to rotate the rotary plate 31 by transmitting rotary force, the fourth driving unit 74 which rotates the collet unit 20, and the connecting member 11 which is vertically extended from a side of the base 10.

The collet unit 20 is fixed on the upper part of the base to form a virtual distance of the camera module for photographing the second chart unit 50, and is coupled with the camera module by the second driving unit 72 to adjust the lens 101 of the camera module to the optimum focusing position.

Figure 7:
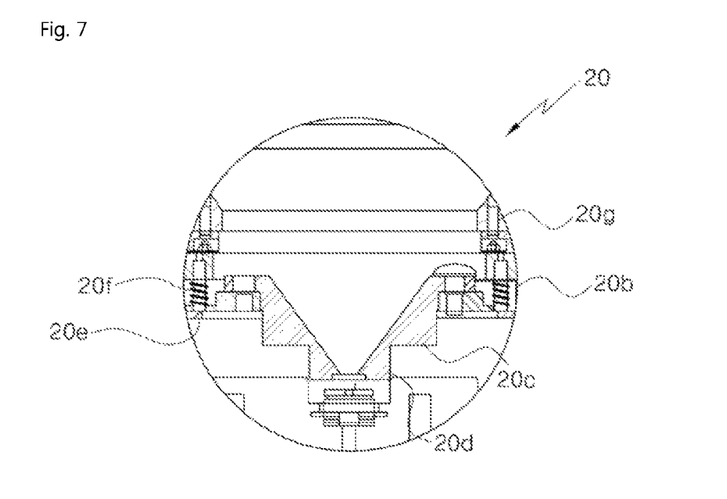
FIG. 7 is a cross-section view illustrating a collect unit of a camera module test apparatus in detail.

Referring to FIG. 7, the collet unit 20 includes a plurality of convex lenses and a plurality of concave lenses mounted on a casing, a pulley 20g rotatably installed on a lower part of the casing to be connected to the belt 74a of the fourth driving unit 74 for rotation, a collet 20c formed on the lower part of the pulley 20g for coupling with the camera module, and a separation preventing unit 20b to prevent separation of the collet 20c.

Meanwhile, the rotary plate 31 to be rotated by the rotary shaft 73a is coupled with the upper part of the rotary shaft 73a and rotated by the third driving unit 73, with the lens 32 and the illuminating unit 33 disposed thereon. The rotary plate 31 includes the first chart unit 60 provided on the upper part.

Accordingly, as the rotary plate 31 is rotated by the third driving unit 73, the lens 32, the illuminating unit 33 and the first chart unit 60 are rotated in association with the movement of the rotary plate 31. The surface of the rotary plate on the lower side of the first chart unit 60 is open so that the first chart unit 60 is seen from the collet unit 20, when the first chart unit 60 is placed in vertical line with respect to the collet unit 20.

The socket frame 40 is constructed to be coupled with a rotary shaft (not illustrated) of the first driving unit 71 to be rotated, and includes the socket boards 41, 42 formed on both upper sides and holes so that the socket boards 41, 42 are lifted up by the second driving unit 72. Accordingly, the socket board 41 is lifted up as the lifting unit 72f (e.g., pin) of the second driving unit 72 is passed through the hole of the socket frame 40 and inserted into the hole formed in the lower part of the socket board 41. The analyzing means may be a terminal, and is connected to the camera module and the camera module test apparatus to control driving of the first to fourth driving units 71, 72, 73, 74 and analyze the photographed information of the camera module for use in the image test, AF driving test and FF controlling of the camera module.

Automatic Camera Module Supply Process

First, referring to FIG. 4, the camera module is mounted on one of the socket boards 41, 42 that is closer to a manipulating unit 91 automatically or manually. Next, by driving the first driving unit 71, the socket frame 40 is rotated 180° so that the socket board 42 with the camera module mounted thereon is aligned vertically with the collet unit.

Next, when the camera test apparatus completes a series of processes including FF controlling, AF driving test and image test according to the present invention, the first driving unit 71 re-rotates the socket frame 40 by 180° so that the camera module finished with the inspection is withdrawn manually or automatically. Another camera module is mounted on the other socket board 41 manually or automatically, before the first driving unit 71 rotates the socket frame 40 by 180° to withdraw the camera module finished with the inspection.

Meanwhile, the first driving unit 71 contributes to continuous inspection of the camera modules by keeping the above-mentioned processes repeating.

Camera Module Image Test

In the automatic camera module supply process, when the camera module for adjustment is placed on the same vertical line as the collet unit 20 by the first driving unit 71, the third driving unit 73 rotates the rotary plate 31 so that the illuminating unit 33 provided on the rotary plate 31 is placed on the same vertical line as the camera module and the collet unit 20. Next, by driving the illuminating unit 33, light is emitted to the camera module to inspect the presence of image defect of the camera module.

Camera Module Fixed Focus (FF) Adjustment

When the image test of the camera module is completed, the third driving unit 73 rotates the rotary plate 31 so that the lens 32 provided on the rotary plate 31 is placed on the same vertical line as the camera module and the collet unit 20. Since the second chart unit 50 is placed on the same vertica line as the lens 32, the camera module and the collet unit 20, if an image of the second chart unit 50 photographed by the camera module is clear, the inspection is completed. Otherwise, i.e., if the image is not clear, the second driving unit 72 is driven to lift up the socket board 41 with the camera module for adjustment mounted thereon to connect to the collet unit 20.

Next, by rotating the pulley 20g of the collet unit 20 with the fourth driving unit 74, the camera module for adjustment is adjusted. If the camera module is adjusted by the fourth driving unit 74, the socket board 41 is moved down by driving the second driving unit 72, and the second chart unit 50 is photographed again with the camera module. As the above process repeats, the FF adjustment of the camera module is completed.

Automatic Focus (AF) Driving Test of Camera Module

When the focusing test of the camera module is completed, the third driving unit 73 is driven to place the illuminating unit 33 on the vertical line with the camera module to conduct an image test. When the image test is completed, the third driving unit 73 is driven to place the first chart unit 60 on the vertical line with the camera module and the collet unit 20, and the AF driving test is completed through the first chart unit 60.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

INDUSTRIAL APPLICABILITY

The present invention provides an effect in which it is possible to conduct fixed focus controlling, image test and AF focus driving test with respect to an AF type camera module with only one equipment.

Further, the present invention provides an effect in which it is possible to conduct fixed focus testing through a simpler driving mechanism, by keeping a focusing chart unit stationary while lifting up or down the camera module.

Further, the present invention provides an effect in which it is possible to prevent inaccurate focus measurement or damage of the lens unit of the camera module due to influence such as contact pressure by the collet unit of the focusing chart unit.

The invention claimed is:

1. A camera module test and focus controlling apparatus, the apparatus comprising:
    a base including therein a first driving unit, a second driving unit, and a third driving unit;
    a socket frame provided on an upper side of the base and rotated by the first driving unit;
    socket boards provided at opposite ends of the socket frame and lifted up by the second driving unit, the socket boards having the camera module mounted thereon;
    a collet unit formed on an upper part of the base and located vertically to the socket board and rotated by a fourth driving unit formed on an upper part of the base;
    a rotary shaft formed on the upper part of the base and connected to a side of the third driving unit;
    a rotary plate engaged with an upper part of the rotary shaft, rotated by the third driving unit and having a lens and an illuminating unit thereon;
    a first chart unit formed on an upper part of the rotary plate; and
    a second chart unit fixed on an upper part of a connecting member which is extended vertically from a side of the base in parallel with the upper part of the base.

2. The camera module test and focus controlling apparatus of claim 1, wherein;
    the first driving unit includes a motor which is engaged with a rotary shaft coupled with a center of the socket frame 40 to rotate the socket frame;
    the second driving unit includes a motor, a ball screw provided adjacent to the motor, pulleys provided on respective sides of the motor and the ball screw to transmit rotary force of the motor to the ball screw, a belt connecting the pulleys and a lifting unit provided on the other side of the ball screw to lift up the socket board placed on the upper part of the socket frame with the lifting unit;
    the third driving unit includes a motor to connect to the rotary shaft placed on the upper part of the base to thus rotate the rotary plate; and
    the fourth driving unit includes a motor provided on the upper part of the base, a pulley connected to a side of the motor, and a belt connecting the pulley and an outer circumferential surface of the collet unit, to thereby rotate the collet unit with the rotation of the motor.

3. The camera module test and focus controlling apparatus of claim 1, further comprising an analyzing means connected with the camera module to perform functions including:
    rotating the rotary plate to the third driving unit so that the vertical positions of the camera module and the illuminating unit are aligned, and irradiating light to inspect presence of an image defect of the camera module;
    rotating the rotary plate to the third driving unit so that the vertical positions of the camera module, the lens and the second chart unit are aligned, photographing the second chart unit with the camera module, and performing fixed focus controlling of the camera module by repeating step ① until the camera module becomes the optimum focus state, in which step ① is the process of receiving the photographed data for analysis of focus state, lifting up the socket board with the second driving unit to connect to the collet unit if the camera module is not in the optimum focus state, driving the collet unit with the fourth driving unit to adjust the camera module, and moving down the socket board with the second driving unit to prevent contact pressure from being exerted on the lens unit of the camera module; and if the camera module is in the optimum focus state, rotating the rotary plate with the third driving unit so that the vertical positions of the camera module and the first chart unit are aligned, and performing an autofocus driving test.

* * * * *